United States Patent
Jeong et al.

(10) Patent No.: US 9,605,206 B2
(45) Date of Patent: Mar. 28, 2017

(54) LIQUID CRYSTAL COMPOSITION AND LIQUID CRYSTAL DISPLAY INCLUDING THE SAME

(71) Applicant: Samsung Display Co., Ltd., Yongin (KR)

(72) Inventors: Kang Seob Jeong, Seongnam-si (KR); Kyung Seon Tak, Hwaseong-si (KR); Min-Hee Kim, Ansan-si (KR); Kyung Hee Lee, Suwon-si (KR); Sun Young Kwon, Seoul (KR); Joon-Hyung Park, Seoul (KR); Ji Hong Bae, Yongin-si (KR); Jong Ho Son, Seoul (KR); Keun Chan Oh, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/806,843

(22) Filed: Jul. 23, 2015

(65) Prior Publication Data

US 2016/0200976 A1    Jul. 14, 2016

(30) Foreign Application Priority Data

Jan. 12, 2015    (KR) .......................... 10-2015-0004214

(51) Int. Cl.
 C09K 11/06    (2006.01)
 C09K 19/30    (2006.01)
 (Continued)

(52) U.S. Cl.
 CPC ........ *C09K 19/3003* (2013.01); *G02F 1/1341* (2013.01); *C09K 2019/0448* (2013.01);
 (Continued)

(58) Field of Classification Search
 None
 See application file for complete search history.

(56) References Cited

U.S. PATENT DOCUMENTS

| 5,965,060 A | 10/1999 | Tarumi et al. |
| 7,785,675 B2 | 8/2010 | Irisawa et al. |
| 9,062,248 B2 | 6/2015 | Seong et al. |

FOREIGN PATENT DOCUMENTS

| CN | WO 2015014217 A1 * | 2/2015 | ............. C09K 19/44 |
| JP | 5350118 | 8/2009 | |
| KR | 10-2014-0014990 | 2/2014 | |

* cited by examiner

*Primary Examiner* — Chanceity Robinson
(74) *Attorney, Agent, or Firm* — H.C. Park & Associates, PLC

(57) ABSTRACT

A liquid crystal composition includes a first class including a first compound represented by Chemical Formula 1, wherein the first compound is 13 to 18 parts by weight based on 100 parts by weight of the total liquid crystal composition, and a second compound represented by Chemical Formula 2, wherein the second compound is 8 to 13 parts by weight based on 100 parts by weight of the total liquid crystal composition, a second class including a third compound represented by Chemical Formula 3. Chemical Formulas 1, 2, and 3 are represented by:

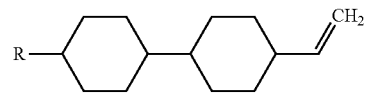

(Chemical Formula 1)

(Chemical Formula 2)

(Continued)

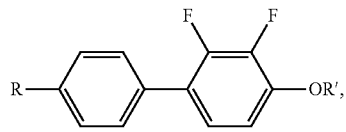
(Chemical Formula 3)
and
wherein R and R' are, independently of each other, a hydrogen atom, or an unsubstituted or substituted C1 to C7 alkyl group.
18 Claims, 7 Drawing Sheets
(51) Int. Cl.
*G02F 1/1341* (2006.01)
*C09K 19/04* (2006.01)
*C09K 19/12* (2006.01)
(52) U.S. Cl.
CPC .. *C09K 2019/122* (2013.01); *C09K 2019/123* (2013.01); *C09K 2019/3004* (2013.01); *C09K 2019/3009* (2013.01); *C09K 2019/3027* (2013.01)

LIQUID CRYSTAL COMPOSITION AND LIQUID CRYSTAL DISPLAY INCLUDING THE SAME

CROSS-REFERENCE TO RELATED APPLICATION

This application claims priority from and the benefit of Korean Patent Application No. 10-2015-0004214, filed on Jan. 12, 2015, which is hereby incorporated by reference for all purposes as if fully set forth herein.

BACKGROUND

Field

Exemplary embodiments relate to a liquid crystal composition and a liquid crystal display including the same.

Discussion of the Background

A liquid crystal display is used in many devises such as watches, calculators, home appliances, measuring devices, automotive instrument and control panels, word processors, electrical organizers, printers, computers, televisions, and the like.

Some liquid crystal display types include: a TN (twisted nematic), a STN (super twisted nematic), a DS (dynamic optical scattering), a GH (guest-host), an IPS (in-plane switching), an OCB (optically compensated birefringence), an ECB (electrically controlled birefringence), a VA (vertical alignment), a CSH (color super homeotropic), a FLC (ferroelectric liquid crystal), or the like. Traditionally, liquid crystal displays used a static drive technique, but now liquid crystal displays use a multiplex drive technique. Some types of multiplex drive liquid crystal displays include a simple matrix type and an active matrix (AM) type. AM type displays driven by TFT (thin film transistor), TFD (thin film diode), or the like have become mainstream.

In displays, an IPS, ECB, VA, CSH type, or the like are characterized by using a liquid crystal material having negative dielectric anisotropy (AO, which is different from a TN or STN type. Among these, a display element requiring a wide viewing angle may use a VA type liquid crystal display with AM driving.

A liquid crystal material used in a liquid crystal display such as a VA type requires low voltage driving, a high-speed response, and a broad operating temperature range. That is, negative dielectric anisotropy, a high absolute value, low viscosity, and high nematic phase-isotropic liquid phase transition temperature (Tni) are required. Further, in a setting of ($\Delta n*d$), which is the product of refractive anisotropy ($\Delta n$) and a cell gap (d), the refractive anisotropy of a liquid crystal material must be adjusted depending on the cell gap to obtain an appropriate range.

The cell gap of a display may be reduced in order to realize a high-speed response in a liquid crystal display, but there is a limitation in reducing a cell gap. A liquid crystal composition having predetermined physical properties may improve the response speed without changing the cell gap. Because a high-speed response is critical to a display outputting a 3D image, the physical properties of a liquid crystal composition are very important.

The above information disclosed in this Background section is only for enhancement of understanding of the background of the inventive concept and therefore it may contain information that does not form the prior art that is already known in this country to a person of ordinary skill in the art.

SUMMARY

Exemplary embodiments provide a liquid crystal composition having predetermined physical properties allowing quick response speed, and also securing high reliability and high transmittance, and a liquid crystal display including the same.

Additional aspects will be set forth in the detailed description which follows, and, in part, will be apparent from the disclosure, or may be learned by practice of the inventive concept.

An exemplary embodiment discloses a liquid crystal composition. The liquid crystal composition includes a first class including a first compound represented by Chemical Formula 1, wherein the first compound is 13 to 18 parts by weight based on 100 parts by weight of the total liquid crystal composition, and a second compound represented by Chemical Formula 2, wherein the second compound is 8 to 13 parts by weight based on 100 parts by weight of the total liquid crystal composition, a second class including a third compound represented by Chemical Formula 3. Chemical Formulas 1, 2, and 3 are represented by:

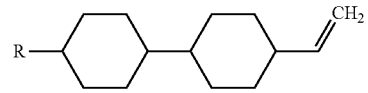

(Chemical Formula 1)

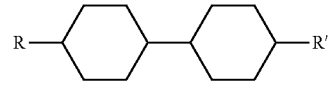

(Chemical Formula 2)

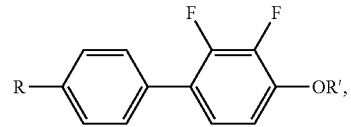

(Chemical Formula 3)

and wherein R and R' are, independently of each other, a hydrogen atom, or an unsubstituted or substituted C1 to C7 alkyl group.

An exemplary embodiment discloses a liquid crystal display. The liquid crystal display includes a first substrate, a second substrate facing the first substrate, an electric field generating an electrode formed on at least one of the first substrate and the second substrate, and a liquid crystal layer including liquid crystal molecules injected between the first substrate and the second substrate. The liquid crystal molecules includes the liquid crystal composition described above.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 1 is a drawing illustrating a process of causing liquid crystal molecules to have a pretilt angle by irradiating ultraviolet rays, and the like.

DETAILED DESCRIPTION OF THE ILLUSTRATED EMBODIMENTS

Figure 1:
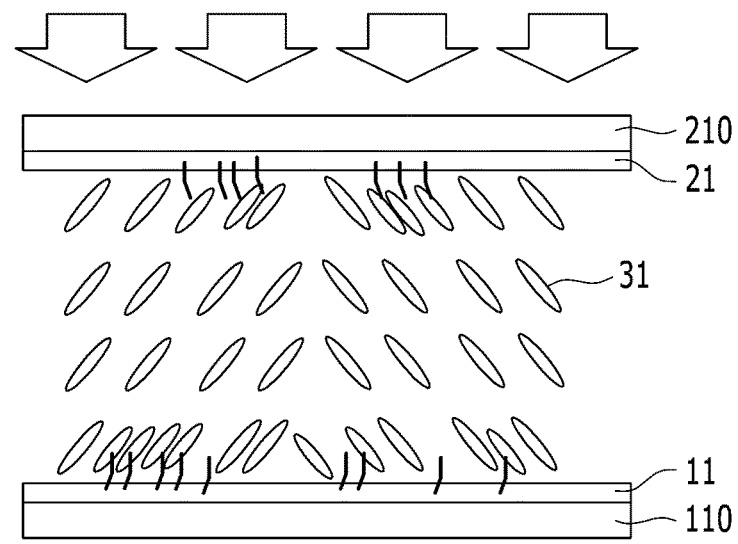

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

According to exemplary embodiments as described above and below, a liquid crystal display having improved response speed, and simultaneously also improved reliability and transmittance may be provided by using a novel liquid crystal composition. In addition, any smudge generated in a liquid crystal display may be reduced.

Figure 3:
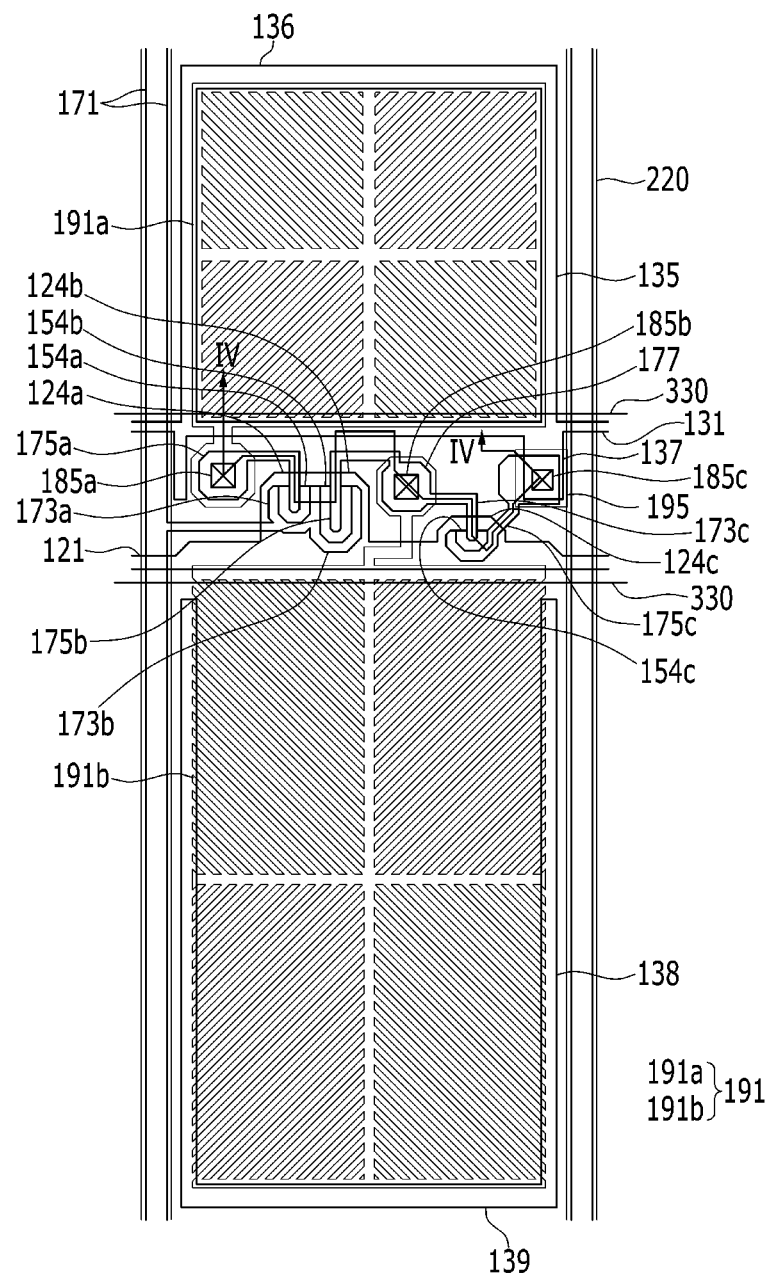
FIG. 3 is a layout view of one pixel of a liquid crystal display according to an exemplary embodiment.

A process in which liquid crystal molecules having a pretilt angle form an alignment layer will be described, with reference to FIGS. 1, 3, 4, and 5. FIG. 1 is a drawing illustrating a process of causing liquid crystal molecules to have a pretilt angle by irradiating ultraviolet rays, and the like. FIG. 3 is a layout view of one pixel of a liquid crystal display according to an exemplary embodiment, and FIG. 4 is a cross-sectional view taken along the line IV-IV of FIG.

Figure 5:
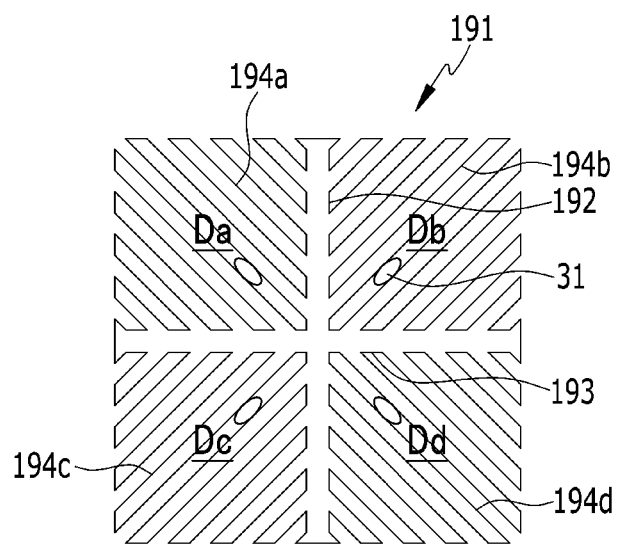
FIG. 5 is a top plan view illustrating a basic region of the pixel electrode shown in FIG. 3.

3. FIG. 5 is a top plan view illustrating a basic region of the pixel electrode shown in FIG. 3.

Referring to FIG. 1, a monomer compound cured by photopolymerization via ultraviolet rays is injected between two display panels 100 and 200 with liquid crystal molecules 31. The compound may be reactive mesogen which polymerizes when exposed to ultraviolet rays.

Figure 4:
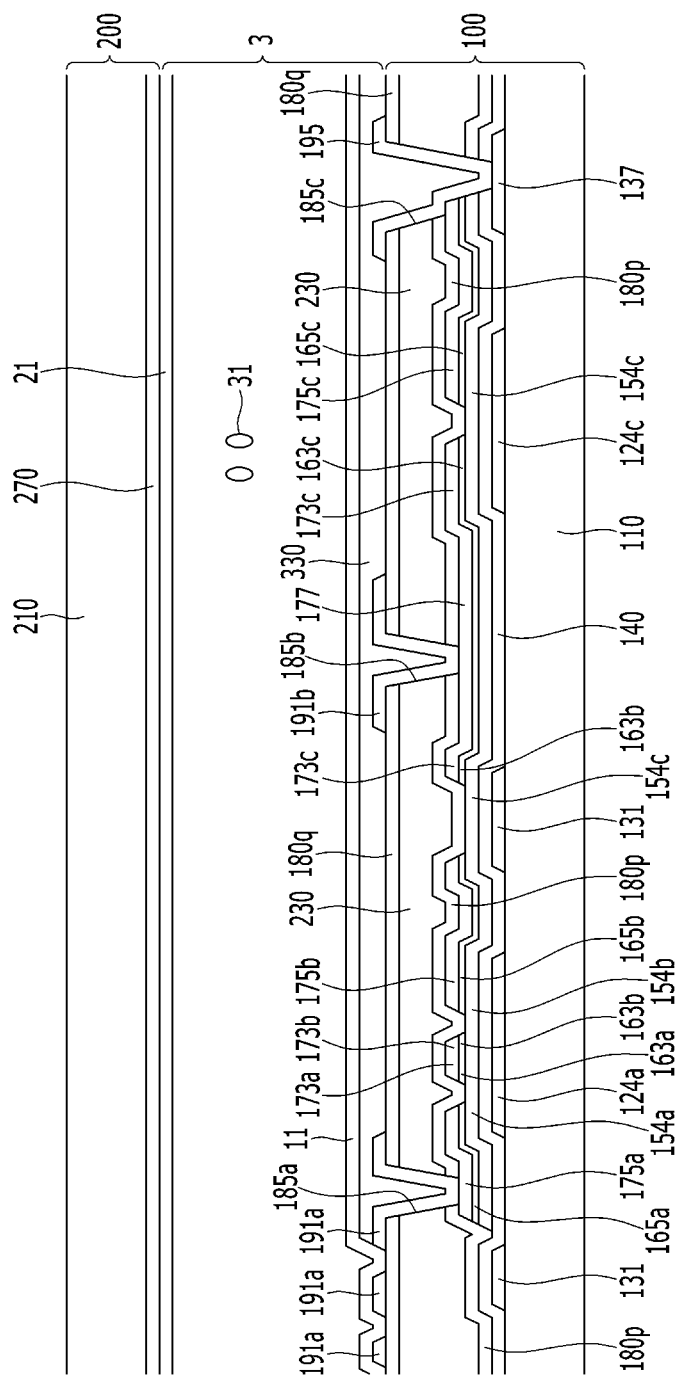
FIG. 4 is a cross-sectional view taken along the line IV-IV of FIG. 3.

Referring to FIGS. 3, 4, and 5, a data voltage is applied to a first sub-pixel electrode 191a and a second sub-pixel electrode 191b, and a common voltage is applied to a common electrode 270 in an upper display panel 200, thereby producing an electric field in a liquid crystal layer 3 between two display panels 100 and 200. Liquid crystal molecules 31 in the liquid crystal layer 3 respond to the electric field to tilt to a direction parallel to a longitudinal direction of fine branch parts 194a, 194b, 194c and 194d, wherein the number of directions to which liquid crystal molecules 31 tilt in one pixel total 4.

When ultraviolet rays irradiate the structure after producing an electric field in a liquid crystal layer 3, reactive mesogen polymerizes to form a polymer adjacent to alignment layers 11 and 21 of the display panels 100 and 200 as shown in FIG. 1. The alignment direction of the liquid crystal molecules 31 is determined to have a pretilt angle in the direction as described above by the polymer.

Further, the ultraviolet ray irradiation process may proceed twice.

First, a UV exposure process of applying an electric field may be carried out. Second, a fluorescence exposure process of curing or exhausting reactive mesogen not reacting in an electric field exposure process may be carried out without applying an electric field.

A liquid crystal composition in liquid crystal molecules and reactive mesogen forming the above described liquid crystal layer 3 will be described in detail.

A liquid crystal composition according to an exemplary embodiment includes a neutral liquid crystal compound (neutral compound) (referred to as a "first class") not representing dielectric anisotropy, and a polar liquid crystal compound (polar compound) (referred to as a "second class") representing dielectric anisotropy.

In an embodiment, the first class includes a first compound represented by Chemical Formula 1, and a second compound represented by Chemical Formula 2:

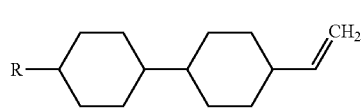

(Chemical Formula 1)

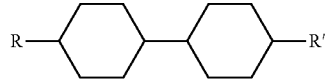

(Chemical Formula 2)

wherein R and R' are, independently of each other, a hydrogen atom, or an unsubstituted or substituted C1 to C7 alkyl group.

In an embodiment, Chemical Formula 1 has one alkenyl group whereas Chemical Formula 2 has two alkyl groups, which may have a different number of carbon atoms. In an embodiment, the alkyl group or the alkoxy group included in each of Chemical Formulas 1 and 2 may have the same number of carbon atoms.

In an embodiment, the first compound and the second compound may have two or more compounds having different alkyl groups.

For example, any one of the first compounds may have an alkyl group having 2 and 3 carbon atoms, and another first compound may have an alkyl group having 4 and 5 carbon atoms. This is identically applied to the second compound. As such, the liquid crystal composition including two or more first compounds or second compounds having different alkyl groups may improve the stability of liquid crystal molecules.

In an embodiment, the first compound may be 13 to 18 parts by weight, based on 100 parts by weight of the total liquid crystal composition. The second compound may be 8 to 13 parts by weight, based on 100 parts by weight of the total liquid crystal composition. If the first compound and second compound are within the described weight range, then a liquid crystal display exhibits a faster response speed and does not deteriorate the reliability and transmittance caused by including the first compound with an alkenyl group.

In an embodiment, the second class includes a third compound represented by Chemical Formula 3:

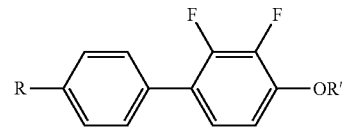

(Chemical Formula 3)

wherein R and R' are, independently of each other, a hydrogen atom, or an unsubstituted or substituted C1 to C7 alkyl group.

In an embodiment, the liquid crystal composition including a certain amount, for example, 10 to 15 parts by weight of the third compound, based on 100 parts by weight of the total liquid crystal composition provides an appropriate viscosity of a liquid crystal layer even when a neutral liquid crystal compound has an alkenyl group.

In an embodiment, the first class may further include a fourth compound represented by Chemical Formula 4:

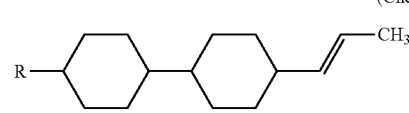

(Chemical Formula 4)

wherein R is a hydrogen atom, or an unsubstituted or substituted C1 to C7 alkyl group.

In an embodiment, the fourth compound may be 8 to 13 parts by weight based on 100 parts by weight of the total liquid crystal composition. When the fourth compound is included in the liquid crystal composition in 8 to 13 parts by weight, the response speed of the liquid crystal display increases because the liquid crystal layer has an appropriate viscosity.

In an embodiment, the second class may further include a fifth compound represented by Chemical Formula 5, and/or a sixth compound represented by Chemical Formula 6:

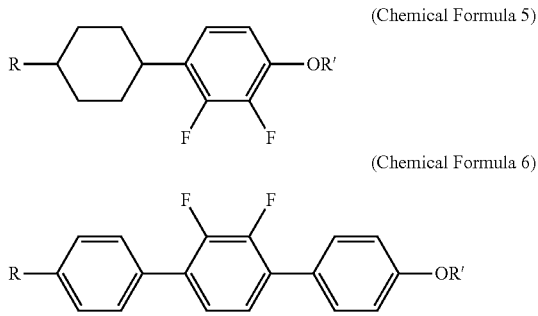

(Chemical Formula 5)

(Chemical Formula 6)

wherein R and R' are, independently of each other, a hydrogen atom, or an unsubstituted or substituted C1 to C7 alkyl group.

In an embodiment, the fifth and sixth compounds are included in appropriate amounts to increase stability in the liquid crystal layer. For example, the fifth compound may be 5 to 10 parts by weight based on 100 parts by weight of the total liquid crystal composition. The sixth compound may be 5 to 10 parts by weight based on 100 parts by weight of the total liquid crystal composition.

In an embodiment, the liquid crystal composition may further include a seventh compound represented by Chemical Formula 7:

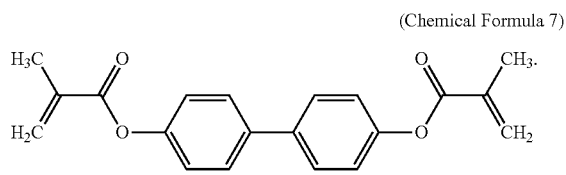

(Chemical Formula 7)

In an embodiment, the seventh compound is a kind of reactive mesogen and includes methacrylate having many reaction sites. The reactive mesogen may form an alignment layer during UV irradiation.

In an embodiment, the seventh compound, which is an acryl-based compound, may be 0.1 to 0.5 parts by weight based on 100 parts by weight of the total liquid crystal composition. The seventh compound may remain in the liquid crystal layer in a predetermined amount even after the complete formation of the liquid crystal layer.

A liquid crystal composition according to an exemplary embodiment may include the first, second, third, fourth, fifth, sixth, and seventh compounds. The first, second, and fourth compounds belong to the first class and are a neutral liquid crystal compounds. The third, fifth, and sixth compounds belong to the second class and are a polar liquid crystal compounds. The seventh compound is a reactive mesogen and forms a pretilt angle.

In the liquid crystal composition according to the present exemplary embodiment, based on a total liquid crystal composition having 100 parts by weight, the first compound is about 13 to 18 parts by weight, the second compound is about 8 to 13 parts by weight, the third compound is less than about 30 parts by weight, for example, about 10 to 15 parts by weight, the fourth compound is about 8 to 13 parts by weight, the fifth compound is about 5 to 10 parts by weight, the sixth compound is about 5 to 10 parts by weight, and the seventh compound is about 0.1 to 0.5 parts by weight.

In an embodiment, the first compound may be about 14 to 16 parts by weight, the second compound may be about 9 to 11 parts by weight, and the third compound may be about 11 to 13 parts by weight of the total liquid crystal composition. When these proportions are used, the liquid crystal layer may exhibit improvements in stability, response speed based on the viscosity, reliability, and transmittance. Thus, a liquid crystal matrix may be designed such that it is not affected by electric field UV energy (low-grey stain) tolerance or a photoinitiator of a sealing agent (border stain).

In an embodiment, the content of the fifth and sixth compounds which make up the polar liquid crystal composition may be controlled to provide an appropriate solubility of the polar liquid crystal composition.

In an embodiment, the seventh compound may be about 0.1 to 0.5 parts by weight of the total liquid crystal composition. For example, the seventh compound may be about 0.2 to 0.4 parts by weight of the liquid crystal composition. A liquid crystal display with a seventh compound of these proportions may provide a liquid crystal matrix easily saturated by a high pretilt angle and with only low UV energy.

The liquid crystal composition including the first, second, third, fourth, fifth, sixth, and seventh compounds may have the following physical properties.

In an embodiment, the liquid crystal composition may have an elastic modulus K33 of 15.5 pN to 17.0 pN, when a phase difference of a panel ($\Delta n * d$) is 310 nm to 340 nm, and satisfy Equation 1:

$6.3 \leq$ rotational viscosity$(\gamma 1)$/elastic modulus$K33 \leq 6.7$ (Equation 1)

In an embodiment, the liquid crystal composition may have refractive anisotropy $\Delta n$ of 0.107 to 0.111, for example 0.109 to 0.111, dielectric anisotropy ($\Delta \in$) of −3.4 to −3.0, for example −3.4 to −3.2, and an elastic modulus K11 of 12.8 pN to 15.8 pN.

In an embodiment, the liquid crystal composition may have an elastic modulus K33 of 15.5 pN to 17.0 pN, when a phase difference of a panel ($\Delta n * d$) is 345 nm to 365 nm, and satisfy Equation 2:

$5.6 \leq$ rotational viscosity$(\gamma 1)$/elastic modulus$K33 \leq 6.0$ (Equation 2)

In an embodiment, the liquid crystal composition may satisfy Equation 3:

$4.5 \leq$ elastic modulus$K33$/|dielectric anisotropy$(\Delta \in)$| $\leq 5.5$ (Equation 3)

In a setting of the phase difference of a panel ($\Delta n * d$), which is the product of refractive anisotropy ($\Delta n$) of the liquid crystal composition and a cell gap (d), refractive anisotropy of a liquid crystal material may be controlled to have a predetermined value depending on the cell gap, and the product of the refractive anisotropy ($\Delta n$) and the cell gap (d) may be controlled to be about 310 nm to 365 nm.

The liquid crystal composition having the physical properties and the content as described above may have improved response speed and be used in a 3D display requiring high speed response physical properties. Because the first class including the neutral liquid crystal compound includes the first compound and the fourth compound having an alkenyl group and the second compound without an alkenyl group, response speed may be improved due to the compounds including of the alkenyl group. An afterimage, stain, or a reactivity decline of the reactive mesogen may be improved by the inclusion of compound without the alkenyl group.

The Chemical Formulas and their amounts by weight in the total liquid crystal composition according to an embodiment are represented in Table 1:

TABLE 1

| Compound | Chemical Formula | Content (parts by weight) |
|---|---|---|
| first compound | R—⬡—⬡—CH=CH$_2$ | 13 to 18 |
| second compound | R—⬡—⬡—R' | 8 to 13 |
| third compound | R—⬡—⬡(F,F)—OR' | 10 to 15 |
| fourth compound | R—⬡—⬡—CH=CH—CH$_3$ | 8 to 13 |
| fifth compound | R—⬡—⬡(F,F)—OR' | 5 to 10 |
| sixth compound | R—⬡—⬡(F,F)—⬡—OR' | 5 to 10 |
| seventh compound | H$_2$C=C(CH$_3$)—C(O)—O—⬡—⬡—O—C(O)—C(CH$_3$)=CH$_2$ | 0.1 to 0.5 |

Figure 2:
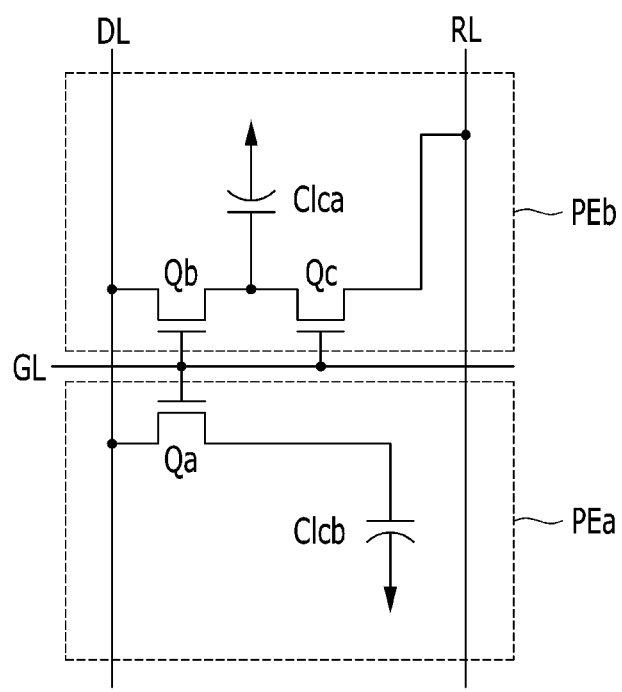
FIG. 2 is an equivalent circuit diagram of a pixel of a liquid crystal display according to an exemplary embodiment.

In a liquid crystal display including the liquid crystal composition as described above, the arrangement of a signal line and a pixel of the display, and a method of driving the same will be described, with reference to FIG. 2. FIG. 2 is an equivalent circuit diagram of one pixel of a liquid crystal display according to an exemplary embodiment.

Referring to FIG. 2, a pixel PX of the liquid crystal display according to the present exemplary embodiment includes a plurality of signal lines. The data signal lines including a gate line GL transmitting a gate signal, a data line DL transmitting a data signal, and a voltage-dividing reference voltage line RL transmitting a voltage-dividing reference voltage. The pixel PX also includes a first, second, and third switching elements Qa, Qb, and Qc as well as first and second liquid crystal capacitors Clca and Clcb.

The first and the second switching elements Qa and Qb are connected to the gate line GL and the data line DL, respectively. The third switching element Qc is connected to an output terminal of the second switching element Qb, and the voltage-dividing reference voltage line RL.

The first switching element Qa and the second switching element Qb are three-terminal elements such as a thin film transistor. The control terminals for the first and second switching elements Qa and Qb are connected to the gate line GL while the input terminals are connected to the data line DL. The output terminal of the first switching element Qa is connected to the second liquid crystal capacitor Clcb. Similarly, the output terminal of the second switching element Qb is connected to the first liquid crystal capacitor Clca as well as the input terminal of the third switching element Qc.

The third switching element Qc is also a three-terminal element such as thin film transistor. The control terminal of the third switching element Qc is connected to the gate line GL while the input terminal is connected to the first liquid crystal capacitor Clca. The output terminal of the third switching element Qc is connected to the voltage-dividing reference voltage line RL.

When a gate-on-signal is applied to the gate line GL, the first switching element Qa, the second switching element Qb, and the third switching element Qc connected to the gate line turn on. Accordingly, data voltage applied to the data line DL is applied to a first sub-pixel electrode PEa and a second sub-pixel electrode PEb via the turned on first switching element Qa and second switching element Qb.

In an embodiment, the data voltages applied to the first sub-pixel electrode PEa and the second sub-pixel electrode PEb are identical to each other and the first liquid crystal capacitor Clca and the second liquid crystal capacitor Clcb are charged to the same value because of the difference between a common voltage and a data voltage. The voltage charged in the first liquid crystal capacitor Clca is simultaneously voltage-divided through the turned on third switching element Qc. Thus, the voltage value charged in the first liquid crystal capacitor Clca is lowered by the difference between the common voltage and the voltage-dividing reference voltage. That is, the voltage charged in the second liquid crystal capacitor Clcb becomes higher than the voltage charged in the first liquid crystal capacitor Clca.

As such, the voltage charged in the first liquid crystal capacitor Clca and the voltage charged in the second liquid crystal capacitor Clcb become different from each other. Because the voltage of the first liquid crystal capacitor Clca and the voltage of the second liquid crystal capacitor Clcb are different from each other, the angles at which the liquid crystal molecules are tilted in the first and the second sub-pixels become different. Thus, the luminance of the two sub-pixels differs from each other. Appropriately adjusting the voltages of the first liquid crystal capacitor Clca and the second liquid crystal capacitor Clcb improves the side visibility of images.

In the illustrated exemplary embodiment, in order to create a difference in voltage charge between the first liquid crystal capacitor Clca and the second liquid crystal capacitor Clcb, a third switching element Qc connected to the first liquid crystal capacitor Clca and the voltage-dividing reference voltage line RL is may be included. However, a liquid crystal display according to another exemplary embodiment of the present inventive concept, the first liquid crystal capacitor Clca may be connected to a step-down capacitor (not shown).

In an embodiment, a third switching element includes a first terminal connected to a step-down gate line (not shown), a second terminal connected to the first liquid crystal capacitor Clca, and a third terminal connected to the step-down capacitor (not shown). According to this embodiment, the first liquid crystal capacitor Clca is partially charged in the step-down capacitor, and thus, the charged voltage between the first liquid crystal capacitor Clca and the second liquid crystal capacitor Clcb may set differently. In an embodiment, the first liquid crystal capacitor Clca and the second liquid crystal capacitor Clcb are connected to different data lines from each other which allows different data voltages to be applies first liquid crystal capacitor Clca and the second liquid crystal capacitor Clcb. Other methods of charging the first liquid crystal capacitor Clca and the second liquid crystal capacitor Clcb to different voltages are envisioned.

Referring to FIGS. 3 through 5, the structure of a liquid crystal display according to the exemplary embodiment illustrated in FIG. 2 will be briefly described. FIG. 3 is a layout view of an example of one pixel of a liquid crystal display according to an exemplary embodiment, and FIG. 4 is a cross-sectional view taken along the line IV-IV of the liquid crystal display of FIG. 3. FIG. 5 is a top plan view illustrating a basic region of a pixel electrode of a liquid crystal display according to an exemplary embodiment.

Referring to FIGS. 3 and 4, a liquid crystal may include a lower display panel 100 and an upper display panel 200 facing each other, a liquid crystal layer 3 interposed between the two display panels 100 and 200, and a pair of polarizers (not shown) attached to the outer surface of the display panels 100 and 200.

First, a lower display panel 100 will be described.

A gate conductor including a gate line 121 and a voltage-dividing reference voltage line 131 is formed on an insulation substrate 110. The insulating substrate 110 may be transparent glass, plastic or the like.

The gate line 121 includes a first gate electrode 124a, a second gate electrode 124b, and a third gate electrode 124c, and a broad end (not shown) for connection to another layer or an external drive circuit.

The voltage-dividing reference voltage line 131 includes first sustain electrodes 135 and 136 and a reference electrode 137.

Second sustain electrodes 138 and 139 are not connected to the voltage-dividing reference voltage line 131, but overlap a second sub-pixel electrode 191b.

A gate insulating layer 140 is formed on the gate line 121 and the voltage-dividing reference voltage line 131.

A first semiconductor 154a, a second semiconductor 154b, and a third semiconductor 154c are formed on the gate insulating layer 140.

A plurality of ohmic contacts 163a, 165a, 163b, 165b, 163c, and 165c are formed on the semiconductors 154a, 154b and 154c.

A data conductor including a plurality of data lines 171 including a first source electrode 173a and second source electrode 173b, a first drain electrode 175a, a second drain electrode 175b, a third source electrode 173c, and a third drain electrode 175c is formed on the ohmic contacts 163a, 165a, 163b, 165b, 163c, and 165c.

A semiconductor and an ohmic contact disposed under the data conductor may be formed simultaneously using one mask with the data conductor.

The data line 171 includes a broad end (not shown) for connecting to another layer or an external drive circuit.

The first gate electrode 124a, the first source electrode 173a, and the first drain electrode 175a form a first thin film transistor (TFT) Qa together with a first semiconductor island 154a. The channel of the thin film transistor Qa is formed in a semiconductor 154a between the first source electrode 173a and the first drain electrode 175a. Similarly, a second gate electrode 124b, a second source electrode 173b, and a second drain electrode 175b form a second thin film transistor Qb together with a second semiconductor island 154b. The channel of thin film transistor Qb is formed in a semiconductor 154b between the second source electrode 173b and the second drain electrode 175b. Also similarly, a third gate electrode 124c, a third source electrode 173c, and a third drain electrode 175c form a third thin film transistor Qc together with a third semiconductor island 154c. The channel of the thin film transistor Qc is formed in a semiconductor 154c between a third source electrode 173c and a third drain electrode 175c.

The second drain electrode 175b is connected to the third source electrode 173c, and includes a widely extended extension part 177.

A first passivation layer 180p is formed on the third source electrode 173c, the first drain electrode 175a, the second drain electrode 175b, and the third drain electrode 175c as well as the exposed semiconductors 154a, 154b, and 154c. The first passivation layer 180p may include an inorganic insulating layer such as silicon nitride or silicon oxide. The first passivation layer 180p may prevent inflow of a pigment of a color filter 230 into the part of exposed semiconductors 154a, 154b and 154c.

A color filter 230 is formed on the first passivation layer 180p. The color filter 230 is stretched in a vertical direction along two data lines adjacent to each other. A first light blocking member 220 is disposed on the first passivation layer 180p, the edge of the color filter 230, and the data line 171 (not shown).

The first light blocking member 220 is stretched along the data line 171 and is disposed between two adjacent color filters 230 (not shown). The width of the first light blocking member 220 may be wider than the width of the data line 171. As such, by forming the width of the first light blocking member 220 to be wider than the width of the data line 171, the first light blocking member 220 may prevent light incident from the outside from being reflected on a surface of the metal data line 171. Light reflected on the surface of the data line 171 interferes with the light passing through the liquid crystal layer 3 and prevents the lowering of a constant ratio of the liquid crystal display.

A second passivation layer 180q is formed on the color filter 230 and first light blocking member 220.

The second passivation layer 180q may include an inorganic insulating layer such as silicon nitride or silicon oxide. The second passivation layer 180q prevents the separation of the color filter 230 and suppresses the contamination of the liquid crystal layer 3 by an organic material such as a solvent from the color filter 230, thereby preventing defects such as an afterimage resulting from a screen drive.

A first contact hole 185a and a second contact hole 185b, which expose the first drain electrode 175a and the second drain electrode 175b, are formed in the first passivation layer 180p and second passivation layer 180q.

A third contact hole 185c exposing a portion of a reference electrode 137 and a portion of a third drain electrode 175c is formed in the first passivation layer 180p, the second passivation layer 180q, and the gate insulating layer 140. The third contact hole 185c is covered with a connecting member 195. The connecting member 195 electrically connects a reference electrode 137 and a third drain electrode 175c exposed through the third contact hole 185c.

A plurality of pixel electrodes 191 are formed on the second passivation layer 180q. Each pixel electrode 191 is separated from each other with a gate line 121 interposed therebetween (not shown), and includes a first sub-pixel electrode 191a and a second sub-pixel electrode 191b neighboring each other in a column direction around the gate line 121. The pixel electrode 191 may be formed of a transparent material such as indium tin oxide (ITO) and indium zinc oxide (IZO). The pixel electrode 191 may be formed of a transparent conductive material such as ITO or IZO, or a reflective metal such as aluminum, silver, chromium or an alloy thereof.

The first sub-pixel electrode 191a and the second sub-pixel electrode 191b include one or more of the illustrated electrode 191 in FIG. 5.

As shown in FIG. 3, the first sub-pixel electrode 191a is physically and electrically connected to the first drain electrode 175a via the first contact hole 185a. Similarly, the second sub-pixel electrode 191b is physically and electrically connected to the second drain electrode 175b via the second contact hole 185b. A data voltage may be applied to the to the first sub-pixel electrode 191a through the first drain electrode 175a while a data voltage may be applied to the second sub pixel electrode 191b through the second drain electrode 175b. Because a portion of the data voltage applied to the second drain electrode 175b is voltage-divided through a third source electrode 173c, a voltage level applied to the first sub-pixel electrode 191a becomes higher than a voltage level applied to the second sub-pixel electrode 191b.

A data voltage is applied to the first sub-pixel electrode 191a and the second sub-pixel electrode 191b produces an electric field with a common electrode 270 of an upper display panel 200. The resulting electric field determines the direction of liquid crystal molecules in the liquid crystal layer 3 between the two electrodes 191 and 270. The luminance of the light passing through the liquid crystal layer 3 is varied based on the direction of the liquid crystal molecules.

A second light blocking member 330 is disposed on the pixel electrode 191. The second light blocking member 330 is formed to cover the entire region where the first transistor Qa, the second transistor Qb, the third transistor Qc, and the contact holes 185a, 185b, and 185c are disposed. The second light blocking member 330 is stretched in a direction identical to the gate line 121 and is disposed to overlap a portion of the data line 171. The second light blocking member 330 is disposed to at least partially overlap two data lines 171 positioned on both sides of one pixel area, thereby preventing the light leakage which may occur in the two data lines 171 and near the gate line 121, as well as the light leakage in the region where the first transistor Qa, the second transistor Qb, and the third transistor Qc are disposed.

Until the second light blocking member 330 is formed, the first passivation layer 180p, the color filter 230, and the second passivation layer 180q are disposed within the region where the first transistor Qa, the second transistor Qb, the third transistor Qc, and contact holes 185a, 185b, and 185c. This allows the positions of the first transistor Qa, the second transistor Qb, the third transistor Qc, and the contact holes 185a, 185b and 185c to be easily distinguished.

A first alignment layer 11 is disposed on the second light blocking member 330. The first alignment layer 11 may be a vertical alignment layer.

The alignment layers 11 and 21 may be formed by including at least one a polyamic acid or polyimid. The alignment layers 11 and 21 may include the reactive mesogen, which may be polymerized by UV irradiation. More specifically, when light such as ultraviolet rays is irradiated after producing an electric field in a liquid crystal layer, the reactive mesogen may polymerize to form a polymer adjacent to alignment layers 11 and 21 as shown in FIG. 1.

An upper display panel 200 will be described.

A common electrode 270 is formed on an insulation substrate 210. A second alignment layer 21 is formed on the common electrode 270. The second alignment layer 21 may be a vertical alignment layer and be formed of the same material as the first alignment layer 11.

The liquid crystal layer 3 has negative dielectric anisotropy and may include the above described first, second, third, fourth, fifth, sixth, and seventh compounds. The seventh compound may be formed on the alignment layers 11 and 21 by a UV irradiation process and partially remain in liquid crystal layer 3.

The liquid crystal molecules (liquid crystal composition) of the liquid crystal layer 3 are aligned in the absence of an electric field so that the major axis is perpendicular to the surface of two display panels 100 and 200.

Referring to FIG. 5, a basic electrode 191 will be described.

As shown in FIG. 5, the overall shape of a basic electrode 191 is a quadrangle and it includes a cross-stem part including a horizontal stem part 193 and a vertical stem part 192 perpendicular to the horizontal stem part 193.

Further, the basic electrode 191 is divided into a first sub-region Da, a second sub-region Db, a third sub-region Dc, and a fourth sub-region Dd by the horizontal stem part 193 and the vertical stem part 192. Each of the sub-regions Da-Dd includes a plurality of first fine branch parts 194a, second fine branch parts 194b, third fine branch parts 194c, fourth fine branch parts 194d.

The first fine branch part 194a is obliquely stretched in an upper-left direction from the horizontal stem part 193 or the vertical stem part 192. The second fine branch part 194b is obliquely stretched in an upper-right direction from the horizontal stem part 193 or the vertical stem part 192. The third fine branch part 194c is obliquely stretched in a lower-left direction from the horizontal stem part 193 or the vertical stem part 192. Finally, the fourth fine branch part 194*d* is obliquely stretched in a lower-right direction from the horizontal stem part 193 or the vertical stem part 192.

The first, second, third, and fourth fine branch parts 194*a*, 194*b*, 194*c* and 194*d* form an angle of about 45° or 135° with a gate lines 121 or a horizontal stem part 193. Further, the fine branch parts 194*a*, 194*b*, 194*c*, and 194*d* of neighboring two sub-regions Da, Db, Dc, and Dd may be perpendicular to each other.

The width of fine branch parts 194*a*, 194*b*, 194*c*, and 194*d* may be about 2.5 μm to about 5.0 μm. The distance between neighboring fine branch parts 194*a*, 194*b*, 194*c*, and 194*d* within one sub-region Da, Db, Dc or Dd may be about 2.5 μm to about 5.0 μm.

According to another exemplary embodiment, the width of fine branch parts 194*a*, 194*b*, 194*c*, and 194*d* closer to the horizontal stem part 193 and the vertical stem part 192 may be wider than the widths of fine branch parts 194*a*, 194*b*, 194*c*, and 194*d* at further points from the horizontal stem part 193 and the vertical stem part 192. For example, FIG. 5 illustrates wider portions of fine branch parts 194*a*, 194*b*, 194*c*, or 194*d* that are close to both the horizontal stem 193 and the vertical stem 192 (i.e., the center of basic electrode 191) while narrowest portions of fine branch parts 194*a*, 194*b*, 194*c*, or 194*d* are furthest from both the horizontal stem 193 and the vertical stem 192. The difference between the widest part and the narrowest part in the width of one fine branch part 194*a*, 194*b*, 194*c*, or 194*d* may be about 0.2 μm to about 1.5 μm.

The first sub-pixel electrode 191*a* is connected to connected to the first drain electrode 175*a* via the first contact hole 185*a* while the second sub-pixel electrode 191*b* is connected to the second drain electrode 175*b* via the second contact hole 185*b*. A data voltage may be applied to the first sub-pixel electrode 191*a* from the first drain electrode 175*a* as well as the second sub-pixel electrode 191*b* from the second drain electrode 175*b*. Sides of the first, second, third, and fourth fine branch parts 194*a*, 194*b*, 194*c*, and 194*d* distort an electric field to produce a horizontal component which determines an inclination direction of the liquid crystal molecules 31. The horizontal component of the electric field is almost parallel to the sides of the first, second, third, and fourth fine branch parts 194*a*, 194*b*, 194*c*, and 194*d*. Therefore, as shown in FIG. 1, the liquid crystal molecules 31 tilt in a direction parallel to a longitudinal direction of the fine branch parts 194*a*, 194*b*, 194*c*, and 194*d*. Because one pixel electrode 191 includes four sub-regions Da, Db, Dc, and Dd having different longitudinal directions of the fine branch parts 194*a*, 194*b*, 194*c*, and 194*d*, the number of the direction in which the liquid crystal molecules 31 tilt may total four. Each of the four domains may have different alignment directions of the liquid crystal molecules 31 and are formed in the liquid crystal layer 3. As such, when the direction in which the liquid crystal molecules tilt is varied, a reference viewing angle of the liquid crystal display becomes wider.

Figure 6:
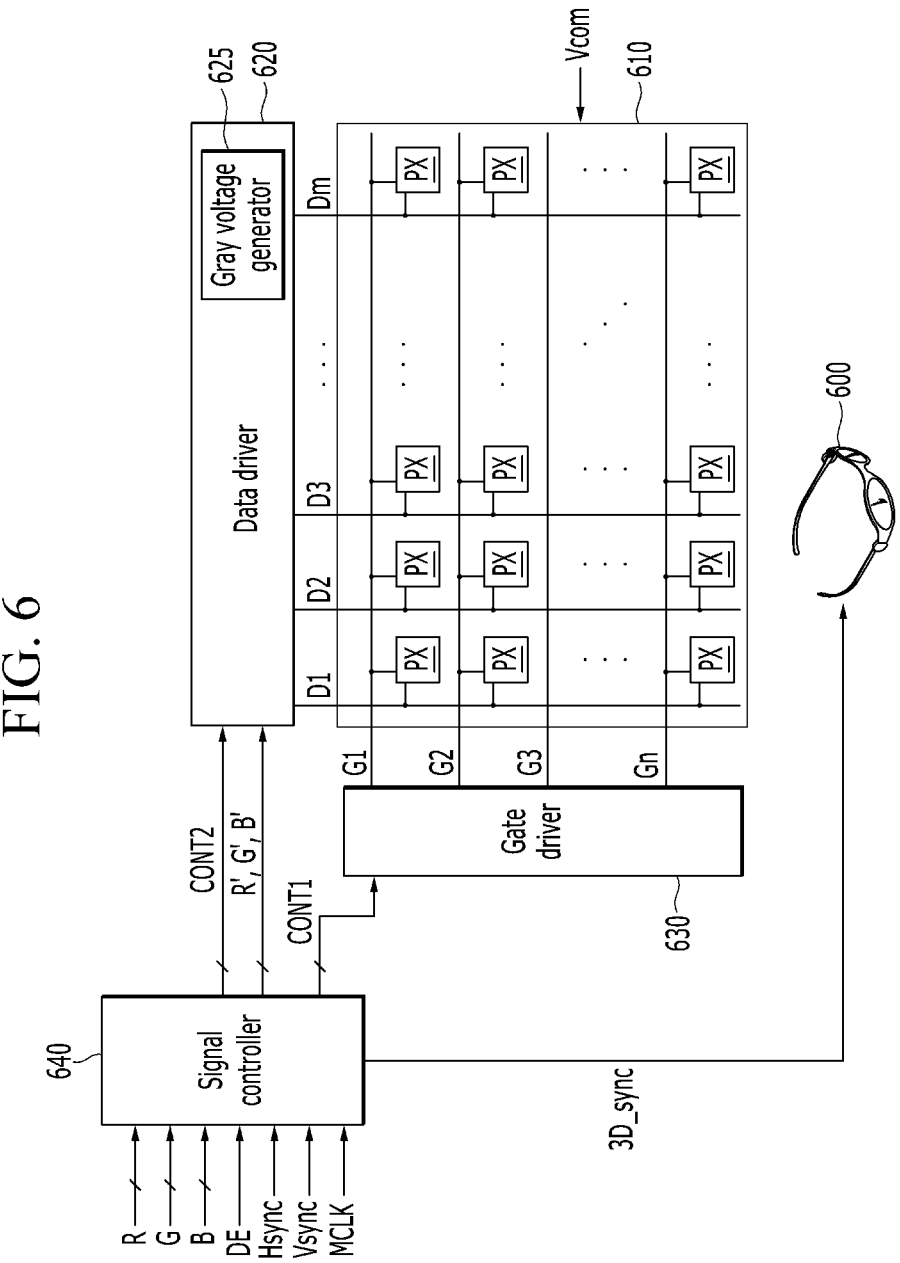
FIG. 6 is a block diagram of a stereoscopic image display device according to an exemplary embodiment.

FIG. 6 is a block diagram of a stereoscopic image display device according to an exemplary embodiment. The liquid crystal composition as described above may be used in a stereoscopic image display device requiring a high speed response.

Referring to FIG. 6, a stereoscopic image display device according to an exemplary embodiment includes, glasses 600 worn by a user to visually recognize a stereoscopic image, a liquid crystal display panel 610 displaying images, a data driver 620 driving the liquid crystal display panel 610, and a gate driver 630, and a signal controller 640 controlling the data driver 620 and the gate driver 630.

A liquid crystal display panel 610 includes a plurality of gate lines G1 through Gn and a plurality of data lines D1 through Dm. The plurality of gate lines G1 through Gn are extended in a horizontal direction while the plurality of data lines D1 through Dm are extended in a vertical direction. The data lines D1 through Dm may be substantially perpendicular to the plurality of gate lines G1 through Gn.

One gate line G1 through Gn and one data line D1 through Dm are connected to one pixel, and one pixel includes a switching element Q connected to gate lines G1 through Gn and data lines D1 through Dm. A control terminal of the switching element Q is connected to gate lines G1 through Gn, an input terminal is connected to data lines D1 through Dm, and an output terminal is connected to a pixel electrode. The pixel electrode forms a column of liquid crystal capacitors. Depending on the exemplary embodiment, one pixel may include two or more sub-pixels, and each sub-pixel has a separate pixel electrode. Additionally, each sub-pixel may have a separate switching element Q, or a common switching element Q.

A liquid crystal display panel 610 may display a stereoscopic image and a 2D image. The stereoscopic image may be displayed separately for each frame as a left-eye image and a right-eye image. As a result, the stereoscopic image may be driven at a higher frequency compared with a 2D image. In the present exemplary embodiment, a 2D image is displayed at 60 Hz while a stereoscopic image is displayed at 120 Hz or 240 Hz. However, a display frequency may vary. Herein, A signal controller 640 may control the stereoscopic image frequency and a 2D image frequency at preset frequencies.

Poor display performance results from existing liquid crystal compositions used in a display device driven at 60 Hz, 120 Hz, or 240 Hz for a stereoscopic image.

Signal controller 640 may receive external image data R, G, and B as well as external control signals such as a vertical synchronizing signal (Vsync), a horizontal synchronizing signal (Hsync), a main clock signal (MCLK), a data enable signal (DE). The signal controller 620 appropriately processes the image data and control signals according to a particular operating condition of the liquid crystal display panel 610 and produces corresponding image data and control signals as outputs. For example, signal controller 640 may send R', G', and B', a gate control signal CONT1, a data control signal CONT2, and a clock signal as outputs.

The gate control signal CONT1 may include a vertical synchronizing starting signal STV ("STV signal") directing the output start of a gate-on pulse (the high period of a gate signal GS) and a gate clock signal CPV ("CPV signal") controlling the output period of a gate-on pulse.

The data control signal CONT2 may include a horizontal synchronizing starting signal ("STH signal") directing the input start of image data R', G', and B' and a load signal TP applying a corresponding data voltage to data lines D1 through Dm.

The signal controller 640 synchronizes on/off filters for the left and right lenses of glasses 600 with appropriate images of the liquid crystal display panel 610 by outputting a glasses synchronizing signal (3D_sync).

The signal controller 640 applies a control signal CONT1, which in turn causes the gate driver 630 to apply a gate-on voltage (Von) and a gate-off voltage (Voff) to connected gate lines G1 through Gn of the liquid crystal display panel 610 in an alternate fashion.

The plurality of data lines D1 through Dm of the liquid crystal display panel 610 are connected to a data driver 620. The data driver 620 receives a data control signal CONT2 and image data R', G', and B' from a signal controller 640. The data driver 620 converts the image data R', G, and B' to a data voltage using a gray voltage of analog produced in a gray voltage generator 625 and transmits the voltage to the data lines D1 through Dm.

In an embodiment, the gray voltage generator 625 may be formed as circuits within a data driver 620 as an integrated circuit or a chip that is attached to outside of the display panel 610. Because an analog voltage may not be applied to the data driver 620 from the outside of the display panel 610, and only a digital signal is applied within the display panel 610, the gray voltage generator may convert digital data signals to analog voltages and vice versa.

Figure 7:
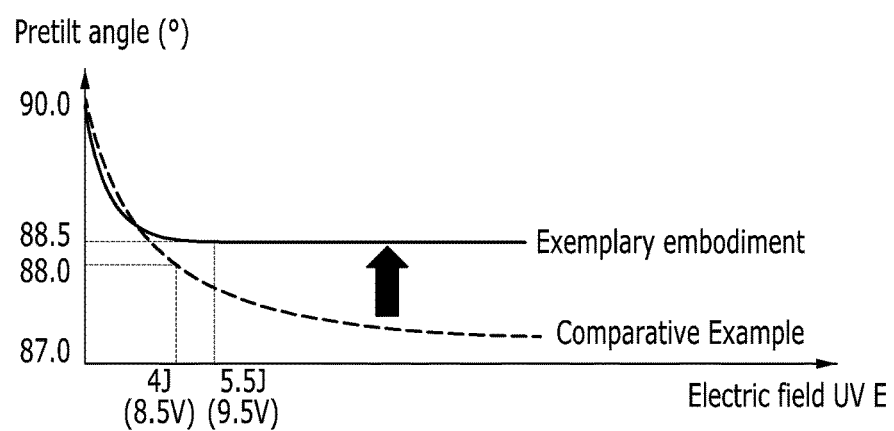
FIG. 7 is a graph representing pretilt angles of an exemplary embodiment and a Comparative Example of the present inventive concept, depending on UV.

FIG. 7 is a graph representing a pretilt angle depending on electric field UV in an exemplary embodiment and a Comparative Example. The liquid crystal composition of an exemplary embodiment includes 15 parts by weight of the first compound, 10 parts by weight of the second compound, 12 parts by weight of the third compound, 10 parts by weight of the fourth compound, 8 parts by weight of the fifth compound, 8 parts by weight of the sixth compound, and 0.3 parts by weight of the seventh compound, based on 100 parts by weight of the total liquid crystal composition. In comparison, the liquid crystal composition of the Comparative Example includes 28.5 parts by weight of the first compound, 0.45 parts by weight of the seventh compound, and further, 0.5 parts by weight of the eighth compound represented by Chemical Formula 8 (described below), based on 100 parts by weight of the total liquid crystal composition. The liquid crystal composition of the Comparative Example does not include the second compound and the third compound, but otherwise has an identical composition to the liquid crystal composition of an exemplary embodiment.

Chemical Formula 8 has the following composition:

(Chemical Formula 8)

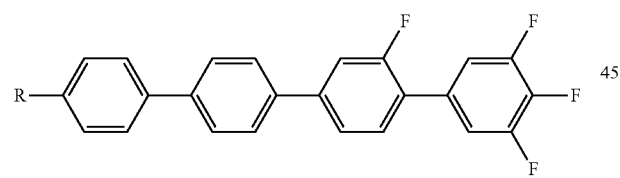

wherein R is a hydrogen atom, or an unsubstituted or substituted C1 to C7 alkyl group.

FIG. 7 illustrates that a liquid crystal display including the liquid crystal composition according to an exemplary embodiment is saturated at a higher pretilt angle (e.g.,) 88.5° in a low electric field UV energy (e.g., 5.5 J), as compared with a liquid crystal display according to the Comparative Example, which has a pretilt angle of less than 88° the same electric field of 5.5 J. FIG. 7 also illustrates that a liquid crystal display of the exemplary embodiment may have a pretilt angle of 88.5° at an electric field UV energy of 4 J while the Comparative Example exhibits pretilt angles of 88° at the same electric field UV energy. Thus, a liquid crystal display including the liquid crystal composition according to an exemplary embodiment minimizes a border stain and a low-grey stain while having quick response speed, thereby improving reliability and transmittance.

In summary, the liquid crystal composition including the first, second, third, fourth, fifth, sixth, and seventh compounds may provide the high speed response level that is required for 3D displays. Liquid crystal layers including these liquid crystal compositions with certain physical properties may exhibit improved reliability and minimize afterimages and stains.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal composition, comprising:
a first class comprising:
a first compound represented by Chemical Formula 1, wherein the first compound is 13 to 18 parts by weight based on 100 parts by weight of the total liquid crystal composition; and
a second compound represented by Chemical Formula 2, wherein the second compound is 8 to 13 parts by weight based on 100 parts by weight of the total liquid crystal composition; and
a second class comprising:
a third compound represented by Chemical Formula 3;
a seventh compound represented by Chemical Formula 7, wherein the seventh compound is 0.1 to 0.5 parts by weight based on 100 parts by weight of the liquid crystal composition,
wherein Chemical Formulas 1, 2, 3, and 7 are represented by:

(Chemical Formula 1)

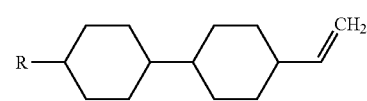

(Chemical Formula 2)

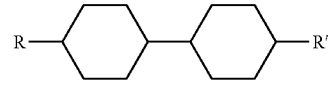

(Chemical Formula 3)

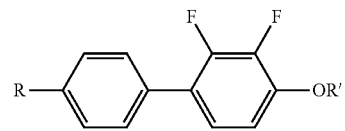

(Chemical Formula 7)

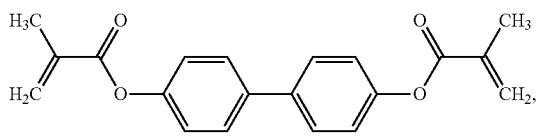

and
wherein R and R' are, independently of each other, a hydrogen atom, or an unsubstituted or substituted C1 to C7 alkyl group.

2. The liquid crystal composition of claim 1, wherein:
the third compound is 10 to 15 parts by weight based on 100 parts by weight of the total liquid crystal composition.

3. The liquid crystal composition of claim 1, wherein the first class further comprises:
a fourth compound represented by Chemical Formula 4:

(Chemical Formula 4)

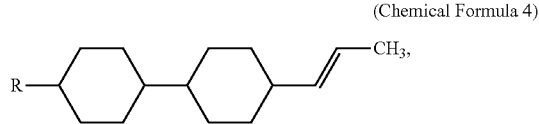

wherein R is a hydrogen atom, or an unsubstituted or substituted C1 to C7 alkyl group.

4. The liquid crystal composition of claim 3, wherein:
the fourth compound is 8 to 13 parts by weight based on 100 parts by weight of the total liquid crystal composition.

5. The liquid crystal composition of claim 3, wherein the second class further comprises a fifth compound represented by Chemical Formula 5:

(Chemical Formula 5)

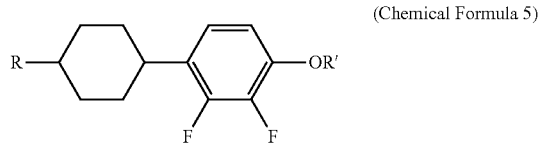

wherein R and R' are, independently of each other, a hydrogen atom, or an unsubstituted or substituted C1 to C7 alkyl group.

6. The liquid crystal composition of claim 5, wherein:
the fifth compound is 5 to 10 parts by weight based on 100 parts by weight of the total liquid crystal composition.

7. The liquid crystal composition of claim 5, wherein the second class further comprises:
a sixth compound represented by following Chemical Formula 6:

(Chemical Formula 6)

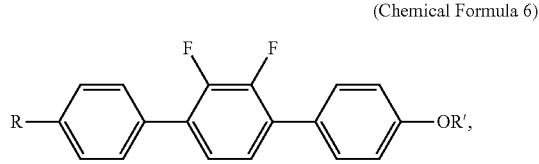

wherein R and R' are, independently of each other, a hydrogen atom, or an unsubstituted or substituted C1 to C7 alkyl group.

8. The liquid crystal composition of claim 7, wherein:
the sixth compound is 5 to 10 parts by weight based on 100 parts by weight of the total liquid crystal composition.

9. The liquid crystal composition of claim 1, having an elastic modulus K33 of 15.5 pN to 17.0 pN when a phase difference of a panel (Δn*d) is 310 nm to 340 nm and satisfying Equation 1:

$$6.3 \leq \text{rotational viscosity}(\gamma 1)/\text{elastic modulus} K33 \leq 6.7 \quad \text{(Equation 1)}.$$

10. The liquid crystal composition of claim 9, further having a refractive anisotropy Δn of 0.107 to 0.111, a dielectric anisotropy (Δ∈) of −3.4 to −3.0, and an elastic modulus K11 of 12.8 pN to 15.8 pN.

11. The liquid crystal composition of claim 1, having an elastic modulus K33 of 15.5 pN to 17.0 pN when a phase difference of a panel (Δn*d) is 345 nm to 365 nm and satisfying Equation 2:

$$5.6 \leq \text{rotational viscosity}(\gamma 1)/\text{elastic modulus} K33 \leq 6.0 \quad \text{(Equation 2)}.$$

12. The liquid crystal composition of claim 1, satisfying Equation 3:

$$4.5 \leq \text{elastic modulus} K33/|\text{dielectric anisotropy}(\Delta \in)| \leq 5.5 \quad \text{(Equation 3)}.$$

13. A liquid crystal display comprising:
a first substrate;
a second substrate facing the first substrate;
an electric field generating an electrode formed on at least one of the first substrate and the second substrate; and
a liquid crystal layer comprising liquid crystal molecules injected between the first substrate and the second substrate,
wherein the liquid crystal molecules comprise the liquid crystal composition of claim 1.

14. The liquid crystal display of claim 13, wherein:
the first class further comprises a fourth compound represented by Chemical Formula 4:

(Chemical Formula 4)

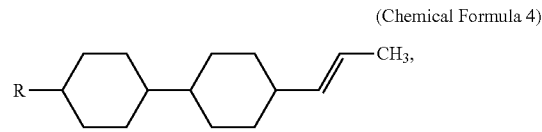

wherein R is a hydrogen atom, or an unsubstituted or substituted C1 to C7 alkyl group.

15. The liquid crystal display of claim 14, wherein:
the second class further comprises a fifth compound represented by Chemical Formula 5:

(Chemical Formula 5)

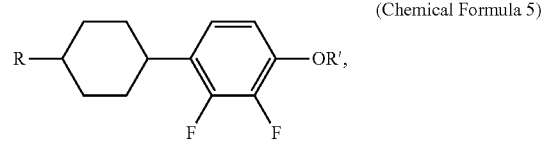

wherein R and R' are, independently of each other, a hydrogen atom, or an unsubstituted or substituted C1 to C7 alkyl group.

16. The liquid crystal display of claim 15, wherein:
the second class further comprises a sixth compound represented by Chemical Formula 6:

(Chemical Formula 6)

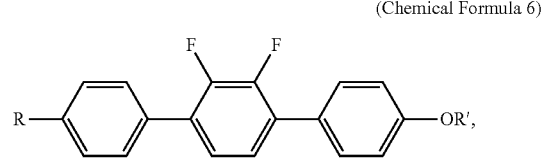

wherein R and R' are, independently of each other, a hydrogen atom, or an unsubstituted or substituted C1 to C7 alkyl group.

17. The liquid crystal display of claim 13, having an elastic modulus K33 of 15.5 pN to 17.0 pN when a phase difference of a panel ($\Delta n^*d$) is 345 nm to 365 nm and satisfying Equation 2:

$$5.6 \leq \text{rotational viscosity}(\gamma 1)/\text{elastic modulus} K33 \leq 6.0 \quad \text{(Equation 2)}.$$

18. The liquid crystal display of claim 13, satisfying Equation 3:

$$4.5 \leq \text{elastic modulus} K33/|\text{dielectric anisotropy}(\Delta \in)| \leq 5.5 \quad \text{(Equation 3)}.$$

* * * * *